UNITED STATES PATENT OFFICE.

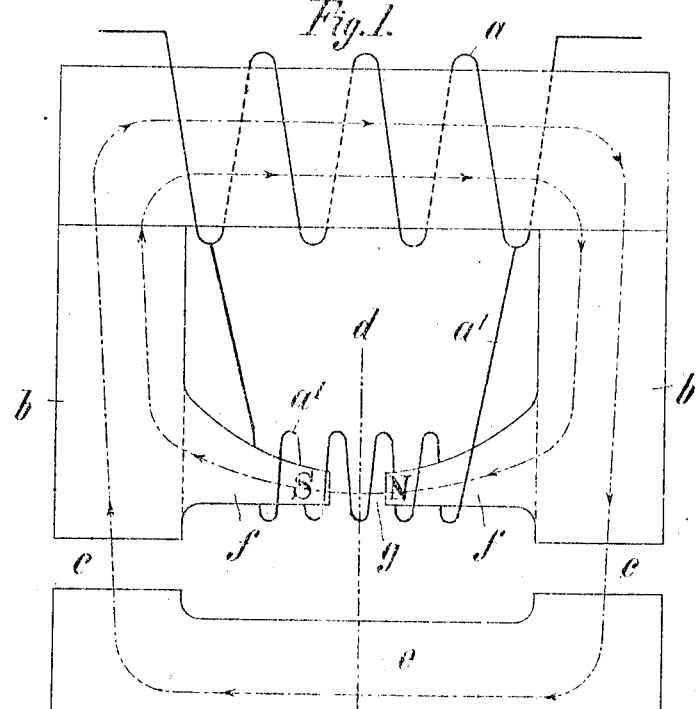

CARL WILHELM JOHN BUSCH, OF PINNEBERG, GERMANY, ASSIGNOR OF ONE-HALF TO HUGO ROOSEN, OF MUNICH, GERMANY.

FIELD SYSTEM FOR MOTOR ELECTRIC METERS.

947,515.  Specification of Letters Patent. Patented Jan. 25, 1910.

Application filed March 18, 1905. Serial No. 250,868.

*To all whom it may concern:*

Be it known that I, CARL WILHELM JOHN BUSCH, a subject of the German Emperor, and resident of Pinneberg, in the Province of Schleswig-Holstein and Kingdom of Prussia, in the German Empire, have invented certain new and useful Improvements in Field Systems for Motor Electric Meters, such as Wattmeters and the Like, of which the following is a specification.

As is known, electric meters without iron possess the disadvantage that on account of the weak fields the force of the system is only a small one, whence result mechanical irregularities, whereas outer fields cause considerable disturbances or faults of the exactness or accuracy of the statements of the meter. But by arranging iron in the path of the lines of force, on the one hand the proportionality will be disturbed, on the other hand on account of the appearances of hysteresis the motion of the meter under a low load will be dependent on previous higher loads of the meter, so that particularly when the meter has been overloaded, for example by short-circuiting, there remains also without working current a remanent field, which causes the watt-hour-meter to be inoperative or run idle.

The object of the present invention is, to render possible the application of iron and to obviate at the same time the disadvantages above stated.

The object aimed at is attained by allowing the field produced by the working current to pass but partially through the armature and by short-circuiting the other part of the field without crossing the armature through an iron-path or iron connection which may be provided with one or more air gaps.

In the accompanying drawings—Figure 1 is a diagrammatic representation of the field magnet of an electric meter which may be used with a disk-armature and being constructed in accordance with and embodying my invention; Fig. 2 is likewise a diagrammatic view, showing a modification; Fig. 3 is a similar view showing a further modification, and Fig. 4 is a diagram illustrating the action of the modified meters.

Similar letters of reference refer to similar parts throughout the several figures.

$a$ is the coil through which the direct working current is passed, $b$ the iron-frame, $c$ the air space or field in which the armature-disk rotates, $d$—$d$ indicates the axis of rotation of the armature, $e$ is the iron return-conductor for the lines of force crossing or traversing the armature, $f$ the iron-shunt, or auxiliary-conductor for the magnetic lines of force which do not traverse or cross the armature, and $g$ an air-gap which may be provided in the said shunt-conductor $f$ if desired. The course and direction of the magnetic lines of force are indicated by dashed and dotted lines and arrow-heads.

After the current has ceased in the coil $a$, a magneto-motive force or remanence remains in the iron-frame $b$ which force sends out lines of force through the magnetic core. The amount of the said magneto-force depends upon the length of the iron path in the frame $b$, the induction (that is to say, the strength of current which has previously passed the coil) and the magnetic properties of the material. Also in the magnetic shunt members $f$ there remains a magneto-motive force, which produces lines of force of the same direction.

The magnet shunt conductors $f$ are magnetized by the passing of the direct current through the coil $a$ and come to saturation before the remaining parts $b$ and $e$. Consequently by the increasing current in $a$ the magnetic lines of force are forced more and more toward $e$ and the magnetic resistance of $b$ and $e$ simultaneously increases and the field in the air gap $c$, in which the fine wire movable coil is located, alters proportionately to the resistance. In any case there will be a remanent magnetism in the parts when the coil $a$ is currentless, but the presence of the shunt conductors $f$ offers a more readily passable path for the lines of force than through the return conductor $c$ and the air gap, so that when coil $a$ is currentless there will be no lines of force in $c$.

By using suitable material for the core parts $b$ and $f$ and by suitably dimensioning these parts it is possible to produce in the shunt members $f$ a magnetomotive force adapted or capable of absorbing all lines of force engendered in the frame $b$, so that when the winding or coil $a$ is currentless, the field at $c$ is also at zero or vanishes. By suitably proportioning the elements in question it is even possible to procure such conditions that the field at $c$ increases or decreases in exact proportion to the current passing through the coil $a$.

Practical experiments have shown that for the magnetic shunt members such materials are most adapted which possess a high coercive force; such materials are preferably paramagnetic metals, as for example, pure nickel. Also magnet-steel, such as employed for permanent magnets, has given a good result, sufficient absorbing action being obtained by compartively short shunt-conductors. Finally, the object of the invention may also be attained by previously magnetizing the shunt-conductor, that is to say, by using a permanent magnet, provided the dimensions of the frame and shunt-conductor are such that when the current reaches its maximum, for example in short-circuiting, the frame and the shunt-conductor are saturated.

In order to insure a reliable and powerful action of the shunt-conductor $f$, it may sometimes be necessary to magnetize or energize the latter strongly. This can be effected by directly surrounding the shunt-conductor $f$ with an energizing coil, which may be in series or in parallel circuit with the wire or coil $a$, so that the whole current to be measured or only a part of the same may pass through the said energizing coil. In Fig. 1 I have shown such an energizing winding or coil $a^1$ in parallel with the winding or coil $a$, the coil $a^1$ on the shunt being reversely wound because the magnetic flux through the shunt is in an opposite direction to that in the core of coil $a$, while the current through $a^1$ is in parallel and in the same direction to the working current in coil $a$. In this figure I have merely shown the field magnet system, it being understood that the rotary member operates in the air-gap $c$.

A field system action which is rather exactly proportional to the current, may be obtained in the following manner. The magnetic shunt-conductor $f$ is made not so strong or powerful that, in the currentless state, it sucks off or absorbs all remanent lines of force, but is made somewhat weaker. Such a system is represented in Fig. 2, in which the magnetic shunt members $f$ are separated by the air-gap $g$. The armature or movable coil of the meter which is mounted to rotate in the air-gap $c$ in the usual manner, is indicated diagrammatically by the coil $l$. The conductors or leads of this coil $l$ are carried up through, or may traverse, a coil in the gap $g$, when they are subjected to a torque due to the flux between the magnetic shunt members $f$, the conductors being arranged to produce a torque in opposition to that of the main coil in the air-gap $c$. By using suitable material and by suitably proportioning the magnetic shunt members and the length of the conductors in the air-gap $g$, the differential action produced upon the rotary member 1 may be made exactly proportional to the current flowing through the meter.

In case the apparatus works with differential action, it is not necessary to have the opposing torque or oppositely acting field in direct connection with the main field. It may rather be produced by a coil $a^1$ (Fig. 3) which is in shunt or in series with the coil $a$ of the main field. The main field $c$ is in this modification energized by the coil $a$ and the differential field $g$ of a separate magnetic conductor $f^1$ by the coil $a^1$. A return member or armature is represented by the parallel branches $l^1$ and $l^2$, which act in opposite direction. But the coil $l$ of Fig. 2 may be used without any alterations in the field arrangement shown by Fig. 3, and the coil branches $l^1$, $l^2$ of Fig. 3 may likewise be used in the field system of Fig. 2.

In the diagram Fig. 4, the ordinates of the curve $m$ $n$ $p$ represent the tractive force which proceeds from the main field and which is proportional to the field or to a magnetizing curve. By means of suitable material and by proper dimensions of the elements a magnetizing curve $t$ $n$ $r$ may be obtained for the opposing torque field, the action of which is such that when the current is zero both actions are equal to or counterbalance each other. As is evident, the resulting tractive force is the difference of the ordinates of the curves $r$ $n$ $p$ and is more exactly proportional to the current $o$—$x$ than the original curves.

The differential coil may be arranged in various ways. For a good action it is necessary to supply the energizing coils as well as the coils acting in a dynamical manner with equal or proportional currents.

While I have shown in the drawings by Figs. 2 and 3 only two striking constructions, I in no wise limit myself thereto, as a great variety of combinations may be produced without involving a departure from the spirit of my invention. The improved field-system may also be used in needle-instruments or needle electric meters.

I claim—

1. A field system for direct current meters, comprising an electro-magnet having an air-gap, a stationary coil to energize the magnet, a magnetic shunt having an energizing winding thereon and capable of absorbing the remanent magnetism to render the field within the air-gap proportional to the current in the stationary coil.

2. A field system for direct current meters, comprising an electro-magnet having a main air-gap, a stationary coil to energize the magnet, a second coil connected in parallel with the stationary coil and a magnetic shunt energized by the second coil and having an air-gap and capable of absorbing the remanent magnetism and rendering the field in the main air-gap proportional to the current in the stationary coil.

3. A field system for direct current meters comprising an electro-magnet having a main air-gap, a coil to energize the same and through which the working current passes, and a magnetic shunt having an air-gap and also energized by the working current the path through said magnetic shunt having a lower air and higher iron reluctance than the main air-gap.

4. A field system for direct current meters comprising a magnet having an air-gap, a stationary coil to energize the same by the passage therethrough of the working current, a magnetic shunt having an air-gap, a branch coil fed by working current to energize the shunt, said magnetic shunt having a low reluctance to small magnetomotive forces, whereby it is capable of absorbing remanent magnetism to render the field in the air-gap in the magnet proportional to the current in the stationary coil.

5. A field system for direct current meters comprising a field magnet having an air-gap, a coil to energize the same by direct working current passing therethrough, a magnetic shunt for the magnet energized by working current and having a greater coercive force than the magnet capable of absorbing remanent magnetism and thereby rendering the field within the air-gap proportional to the current in the stationary coil.

6. A field system for electric measuring instruments, comprising a main field magnet having an air-gap, a current winding energizing the same, a return magnetic conductor, and a magnetic shunt for said magnet having an air-gap, and providing a path of lower reluctance for small magnetomotive forces than the path through the return magnetic conductor.

7. A field system for direct current meters comprising an electro-magnet having a main air-gap, a coil to energize the same and through which the working current passes, and a magnetic shunt having an air-gap and having a lower reluctance for small magnetomotive forces and a higher reluctance for large magnetomotive forces than the path through the main air-gap.

8. In a direct current measuring instrument, an electro-magnet having an air-gap, a return magnetic conductor for the magnet, a magnetic shunt for the magnet having a lower reluctance for small magnetomotive forces and a higher reluctance for large magnetomotive forces than the path through the air-gap and return magnetic conductor, and a coil rotatable within the air-gap.

9. In a direct current measuring instrument, an electro-magnet having a main air-gap, a magnetic shunt having an air-gap, an energizing coil upon said magnet, an auxiliary energizing coil upon said magnetic shunt, said shunt having a low reluctance for low magnetomotive forces and becoming saturated for the normal working current, and a coil rotatable within the main air-gap.

CARL WILHELM JOHN BUSCH.

Witnesses:
MAX LEMCKE,
ERNEST H. L. MUMMENHOFF.